(12) United States Patent
Carangelo

(10) Patent No.: US 8,104,136 B2
(45) Date of Patent: Jan. 31, 2012

(54) WINDSHIELD WIPER BLADE DEVICE

(76) Inventor: Patrick J. Carangelo, E. Stroudsburg, PA (US)

( * ) Notice: Subject to any disclaimer, the term of this patent is extended or adjusted under 35 U.S.C. 154(b) by 384 days.

(21) Appl. No.: 12/315,148

(22) Filed: Nov. 28, 2008

(65) Prior Publication Data

US 2010/0132148 A1 Jun. 3, 2010

(51) Int. Cl.
*B60S 1/38* (2006.01)
*B60S 1/28* (2006.01)

(52) U.S. Cl. ............ 15/250.41; 15/250.361; 15/250.48

(58) Field of Classification Search .............. 15/250.41, 15/250.4, 250.361, 250.001, 250.48, 257.01
See application file for complete search history.

(56) References Cited

U.S. PATENT DOCUMENTS

| | | | | |
|---|---|---|---|---|
| 2,141,023 A | * | 12/1938 | Ryan | 15/250.03 |
| 3,021,548 A | * | 2/1962 | Stoller | 15/250.48 |
| 3,199,563 A | * | 8/1965 | Forrest | 15/250.361 |
| 3,417,421 A | * | 12/1968 | Retke | 15/250.41 |
| 5,732,436 A | * | 3/1998 | Feigenbaum | 15/250.41 |
| 6,070,287 A | * | 6/2000 | Kornegay | 15/250.001 |
| 2005/0235448 A1 | * | 10/2005 | Richard | 15/257.01 |

FOREIGN PATENT DOCUMENTS

| | | | |
|---|---|---|---|
| CH | 588368 | * | 5/1977 |
| DE | 2517489 | * | 10/1976 |
| NL | 7409913 | * | 7/1974 |

OTHER PUBLICATIONS

Machine language translation of last paragraph of description portion of NL 7409913 published Jul. 1974.*

* cited by examiner

*Primary Examiner* — Gary Graham
(74) *Attorney, Agent, or Firm* — Armand M. Vozzo, Jr.

(57) ABSTRACT

A windshield wiper blade device is constructed and formed to be releasably secured in a fitted engagement upon an existing wiper arm and blade assembly to provide an effective wiping blade that is easily installed and replaceable in an integral form. The present device comprises a wiper jacket constructed in an envelope-like form partially sealed along its top edge and open but sealable along the remainder of the edge to allow the insertion of an existing wiper blade assembly within the walls of the jacket. A bladed edge having a multi-channel configuration is provided externally along the bottom of the jacket while the interior length of its chamber is formed to provide an angled nesting area for the foot of the wiper blade assembly inserted within the jacket. The chamber walls of the wiper jacket are lined with a resilient foam material on opposite sides to engage the existing blade assembly transversely and secure its position within the wiper jacket. The open top edge of the wiper jacket is provided with fastening material on opposed surfaces and a plurality of releasable straps to selectively close the open edge in a sealed engagement.

19 Claims, 5 Drawing Sheets

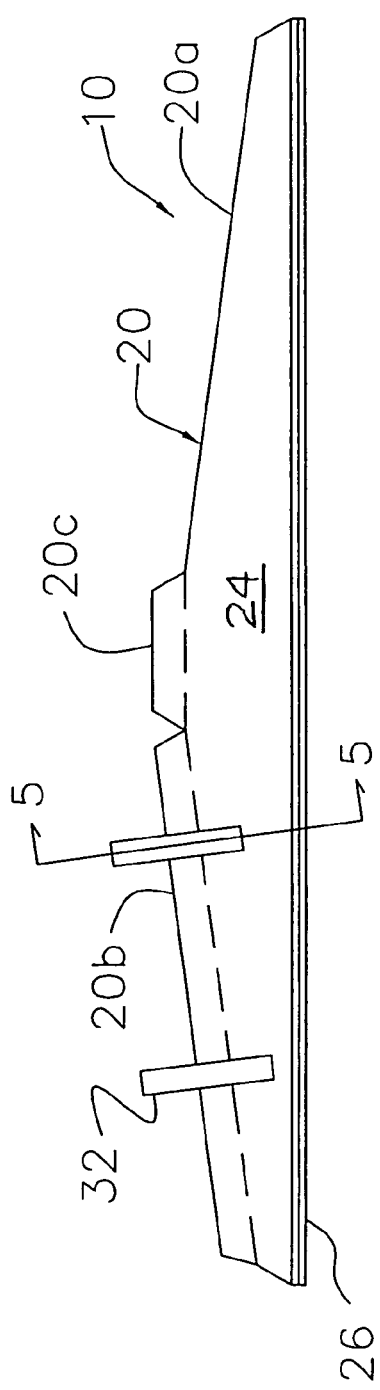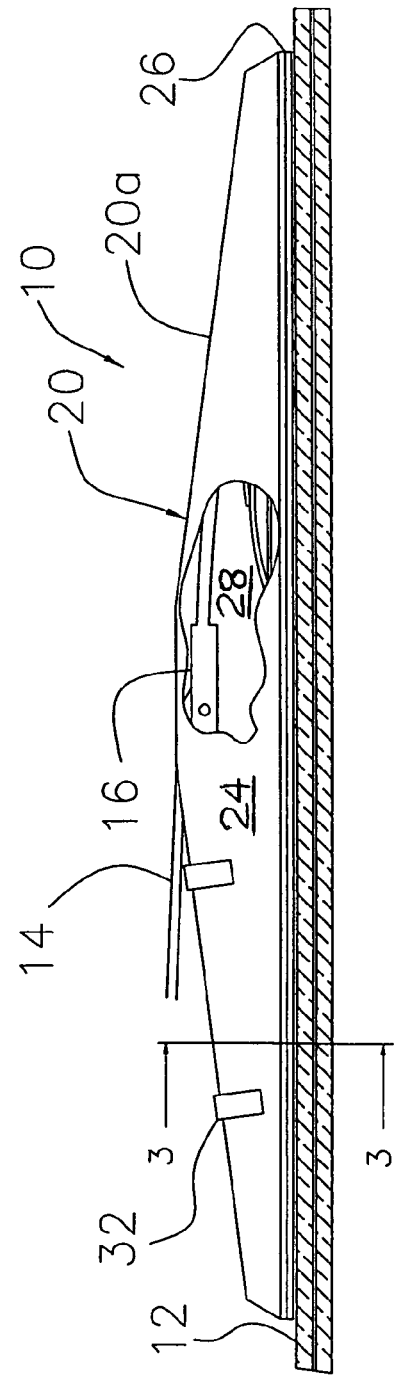

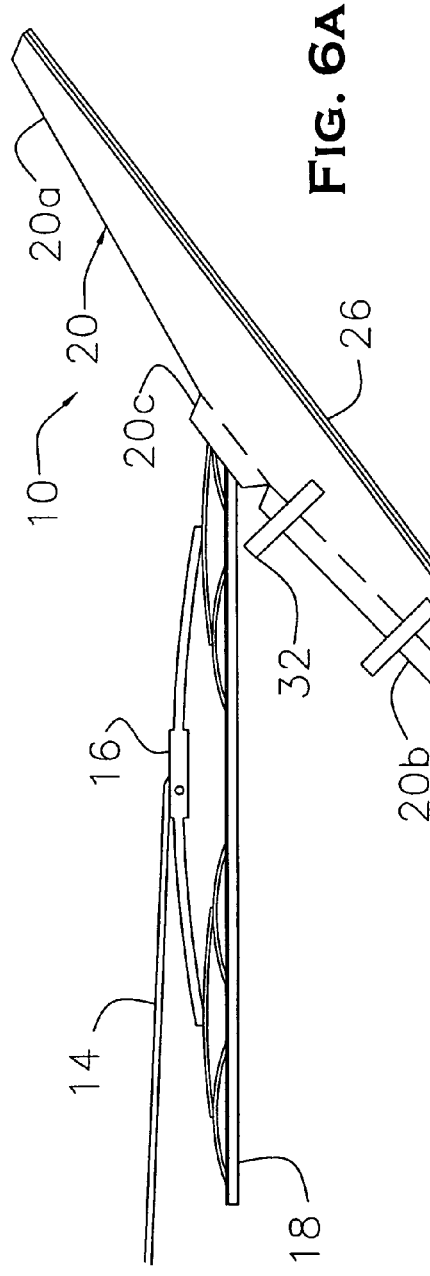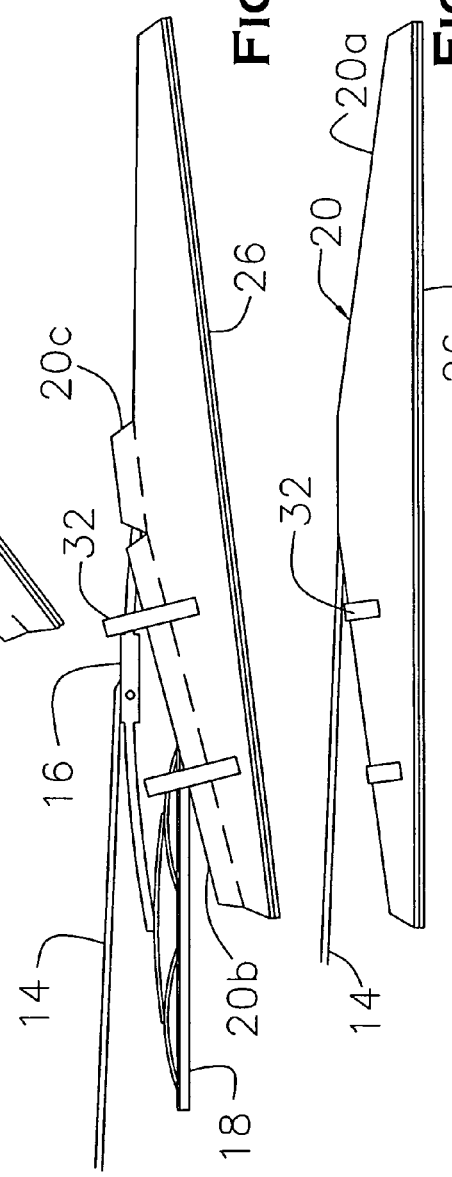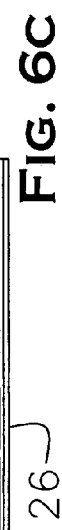

WINDSHIELD WIPER BLADE DEVICE

BACKGROUND OF THE INVENTION

The present invention relates to windshield wipers such as used on automobiles and other motor vehicles, and more particularly to an improved windshield wiper blade device that is constructed and formed to be releasably secured in a fitted engagement upon a conventional wiper arm to provide an effective wiping blade that is easily installed and replaceable in an integral form.

Since the invention of the automatic windshield wiper system for moving vehicles in the early 1900s, there have been numerous improvements that have been designed and developed to enhance the operation and efficiency of the automated system and the component parts thereof and provide increased visibility to the driver of the vehicle. The traditional windshield wiper blade system comprises a wiper blade frame assembly designed to hold the blade element and movable upon a wiper arm that is operatively connected to a motor and mounted for rotational movement in reciprocal directions adjacent the windshield of a vehicle such as a car, truck, boat or plane. The wiper blade frame assembly normally carries a removable wiper blade that is positioned in intimate contact with the windshield so that water and debris deposited upon the windshield can be swept away and cleared from the driver's view. While many of the improvements have been related to the electro-mechanical elements that power and control the reciprocal movement, both continuously and intermittently across the windshield, a significant number of design enhancements have been directed to the wiper blade frame assembly and its blade element with a common design motivation being to continuously maintain the wiper blades in intimate, conforming contact with the windshield during operation so that water and debris may be cleared way uniformly and without leaving streaks. While prior art improvements to the wiper blade and its frame assembly structure have generally resolved the problem of keeping the wiper blades in a close, conforming relationship with the windshield with pressure being evenly applied over the length of the blade, a problem still persists with the longevity of their effective operation and their ability to provide clear, streak-free results over extended durations and frequencies of usage.

Because of regular exposure to sunlight and other adverse weather conditions, windshield wiper blades tend to wear out quickly and become brittle with age, resulting in lost effectiveness. Wiper blades are normally constructed of rubber or other like material and the alternate exposure to the heating effects of the sun and the cooling effects of the rain cause the wiper blades to lose much of their flexibility, becoming cracked or damaged to the extent that only portions of the blade may make contact with the windshield during its sweeping operation. This typically results in only partial clearing of rainwater and accumulated dirt from the windshield and when driving at relatively high speeds, the reduced visibility that is caused can be extremely dangerous to the driver and passengers of the vehicle. Immediate replacement of the damaged wipers in such circumstances is essential to safety and may be lifesaving, and despite prior art improvements to wiper blades and their frame assemblies, there remains a need for a reliable wiper blade device that will replace a damaged windshield wiper blade in a quick and easy manner and produce immediate and effective cleaning of the windshield.

SUMMARY OF THE INVENTION

Accordingly, it is a general purpose and object of the present invention to provide an improved means for completing an effective wiper blade replacement on an automatic windshield wiper system installed upon a moving vehicle.

A more particular object of the present invention is to provide an improved device for effecting replacement of a worn or damaged windshield wiper blade that is easily implemented by hand without need for special fittings or adapters.

Another object of the present invention is to provide an improved device for windshield wiper blade replacement that is universally adapted for use with the conventional automated wiper blade systems currently installed on vehicles.

Still another object of the present invention is to provide an improved windshield wiper blade device that is easy and ready to install as an effective replacement blade particularly in emergencies when roadside technical assistance is not immediately available.

A still further object of the present invention is to provide an improved windshield wiper blade device that is economic and relatively inexpensive to manufacture and durable in its performance under all weather conditions.

Briefly, these and other objects of the present invention are accomplished by a windshield wiper blade device that is constructed and formed to be releasably secured in a fitted engagement upon an existing wiper arm and blade frame assembly to provide an effective wiping blade that is easily installed and replaceable in an integral form. The present device comprises a wiper jacket made from an extruded rubber material and constructed having a chamber partially sealed along its top edge and open but sealable along the remainder of the edge to allow the insertion of an existing wiper blade frame assembly within the chamber of the jacket. A bladed edge having a multi-channel configuration is provided externally along the bottom of the jacket while the interior length of the chamber is formed to provide an angled nesting area for the foot of the blade assembly inserted within the jacket. The chamber walls of the wiper jacket are lined with a resilient foam material on opposite sides to engage the existing blade frame assembly transversely and secure its position within the wiper jacket. The open top edge of the wiper jacket is provided with fastening material on opposed surfaces and a plurality of releasable straps to selectively close the open edge in a sealed engagement. In this closed configuration secured upon the structure of the existing wiper blade assembly, the present wiper blade device is driven to move concomitantly with the jacketed structure and serve as a replacement wiper blade.

For a better understanding of these and other aspects of the present invention, reference should be made to the following detailed description taken in conjunction with the accompanying drawings in which like reference numerals and character designate like parts throughout the figures thereof.

BRIEF DESCRIPTION OF THE DRAWINGS

For a fuller understanding of the nature and objects of the present invention, references in the detailed description set forth below shall be made to the accompanying drawings in which:

FIG. 2 is a longitudinal plan view of the windshield wiper blade device of FIG. 1 shown in position upon the windshield and with a portion cut away to view the underlying wiper arm blade assembly;

FIG. 4 is a longitudinal plan view of the windshield wiper blade device of the present invention as it appears prior to placement upon the wiper arm blade assembly;

FIGS. 6A-6C is a series of longitudinal views illustrating the placement and securing of the windshield wiper blade device upon the wiper arm blade assembly in accordance with the present invention.

DETAILED DESCRIPTION OF THE INVENTION

The following is a detailed description of a preferred embodiment of the present invention and the best presently contemplated mode of its production and practice. This description is further made for the purpose of illustrating the general principles of the invention but should not be taken in a limiting sense, the scope of the invention being best determined by reference to appended claims.

Figure 1:
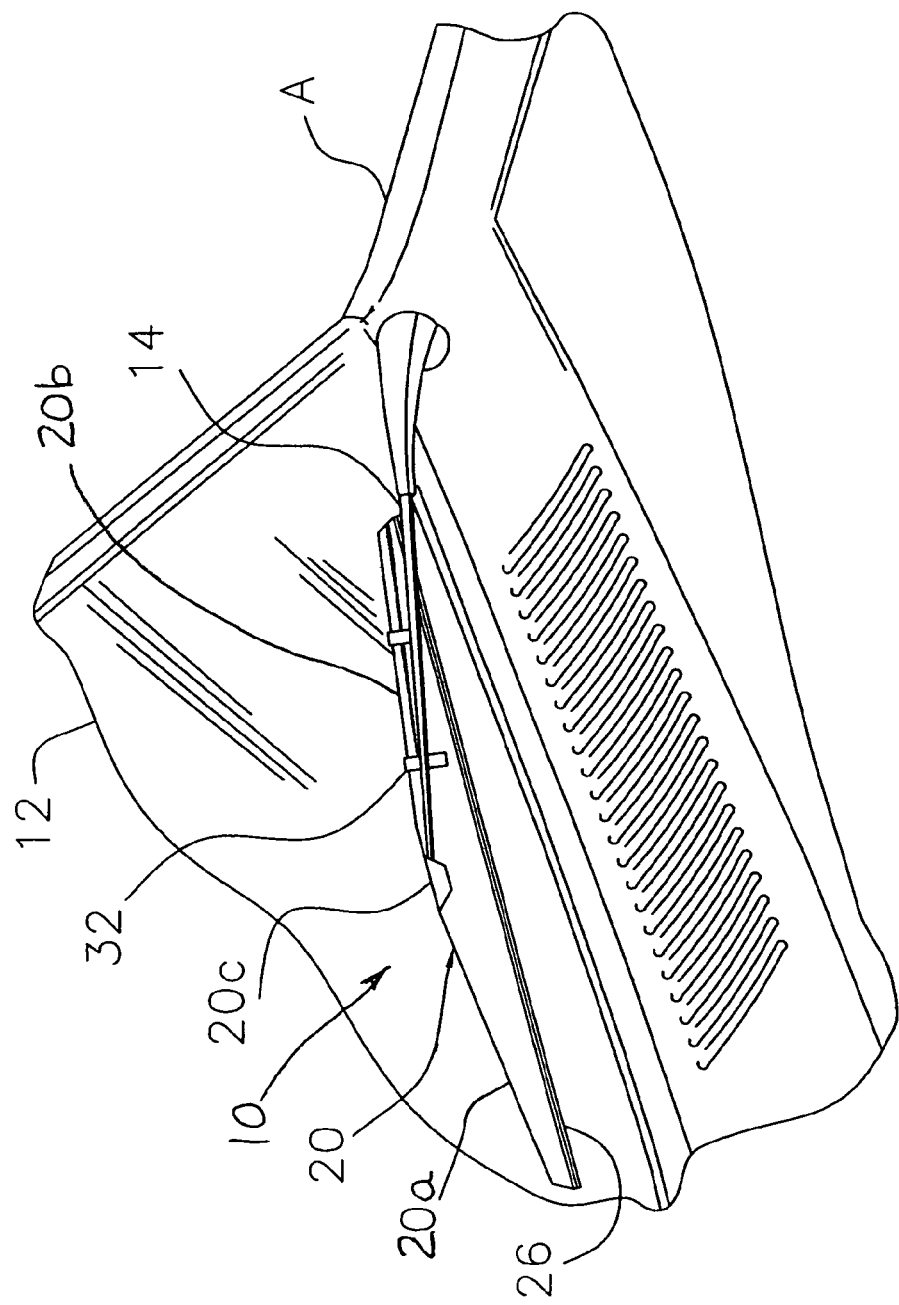
FIG. 1 is a perspective view of a windshield wiper blade device constructed in accordance with the present invention and shown fittingly secured over a conventional wiper arm blade assembly operatively connected to a motor vehicle.

Referring now to FIG. 1, a windshield wiper blade device, generally designated 10, is shown in accordance with the present invention disposed upon the windshield 12 of an automobile or other motor vehicle A in operative engagement with a conventional wiper arm 12 and its associated wiper blade assembly 16 installed for automatic sweeping movement across the windshield. The present wiper blade device 10 comprises an elongated wiper jacket 20 specially constructed and formed in an envelope-like fashion to fit over and secure upon the wiper blade assembly 16 while it may rest upon the windshield 12 and be intermittently swept across the windshield surface. The wiper jacket 20 is closed at both ends of its length, forward and rearward, and is sealed along a closed portion 20a of its top edge near the forward end thereof. The remainder of the top edge of the wiper jacket 20 is made open between the approximate center of the jacket and the rearward end thereof, the partially opened top edge of the wiper jacket allowing inserted positioning of the existing wiper blade assembly 16 as described in greater detail below. A central flap 20c and one or more sealing straps 32 secured about a separate side flap 20b are provided along the partially opened top edge of the wiper jacket 20 to close the open edge and seal the wiper blade assembly 16 inside the jacket. The bottom of the wiper jacket 20 is provided with a bladed edge 26, described below in greater detail, the bladed edge being designed to rest in intimate contact with the windshield 12 when the wiper jacket is in place and move in a sweeping fashion concomitantly with the jacketed blade assembly 16 to clear water from the windshield surface.

Figure 3:
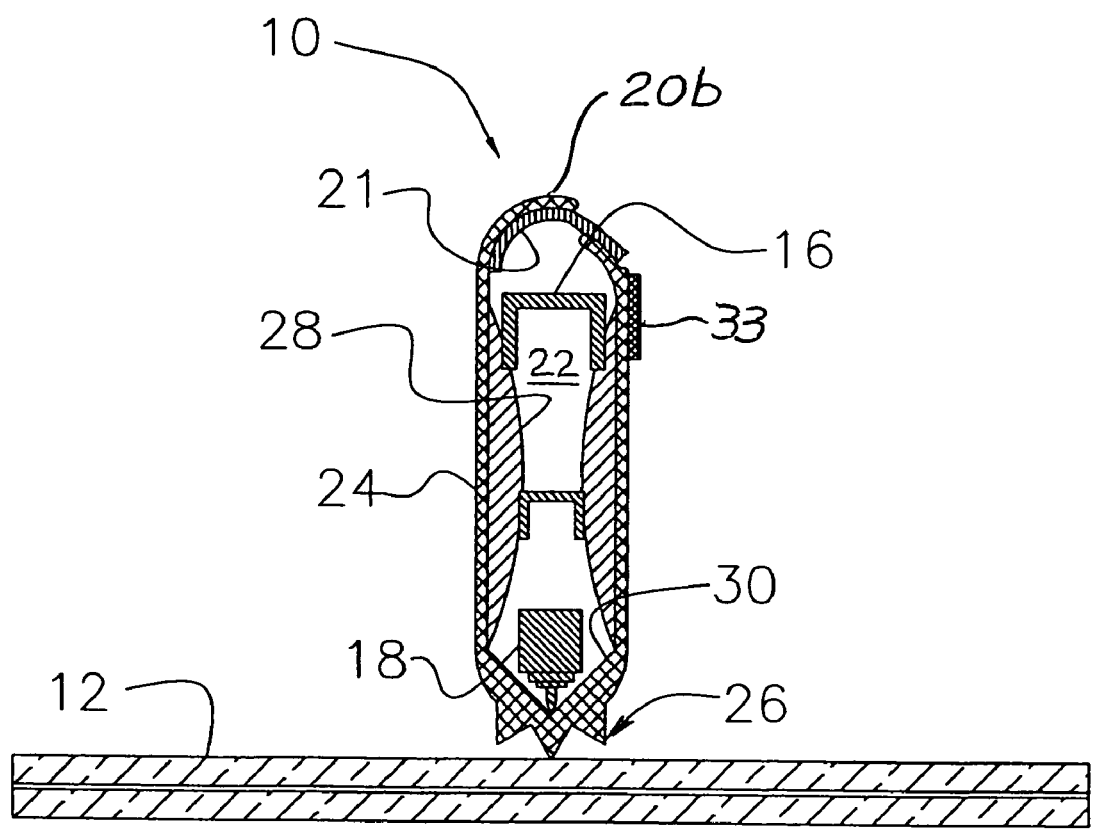
FIG. 3 is a transverse cross sectional view of the present invention taken along the line 3-3 in FIG. 2.

Referring now to FIGS. 2 and 3 in conjunction with FIG. 1, the wiper jacket 20 is formed and fitted to closely outline and contain the conventional wiper blade assembly 16 within the chamber 22 of the wiper jacket. In the form typically found on motor vehicles, the wiper blade assembly 16, best seen in FIGS. 6A-6C, is a flexible frame structure pivotally coupled at the top thereof to the outer end of the wiper arm 14 and further made to branch longitudinally and downwardly to provide a flexible linear support at its base that carries the wiper blade 18 and holds it in place upon the windshield 12. In accordance with the present invention, the wiper jacket 20 is designed and constructed to envelope substantially the entire frame structure of the existing wiper blade assembly 16 from the upper connection with the wiper arm 14 to the base support including the wiper blade 18 carried thereon with the chamber 22 of the wiper jacket being further formed to confine the structure of the wiper blade assembly in all directions and thereby hold it firmly within the wiper jacket despite any movement imposed upon or transmitted to the wiper blade assembly.

Figure 5:
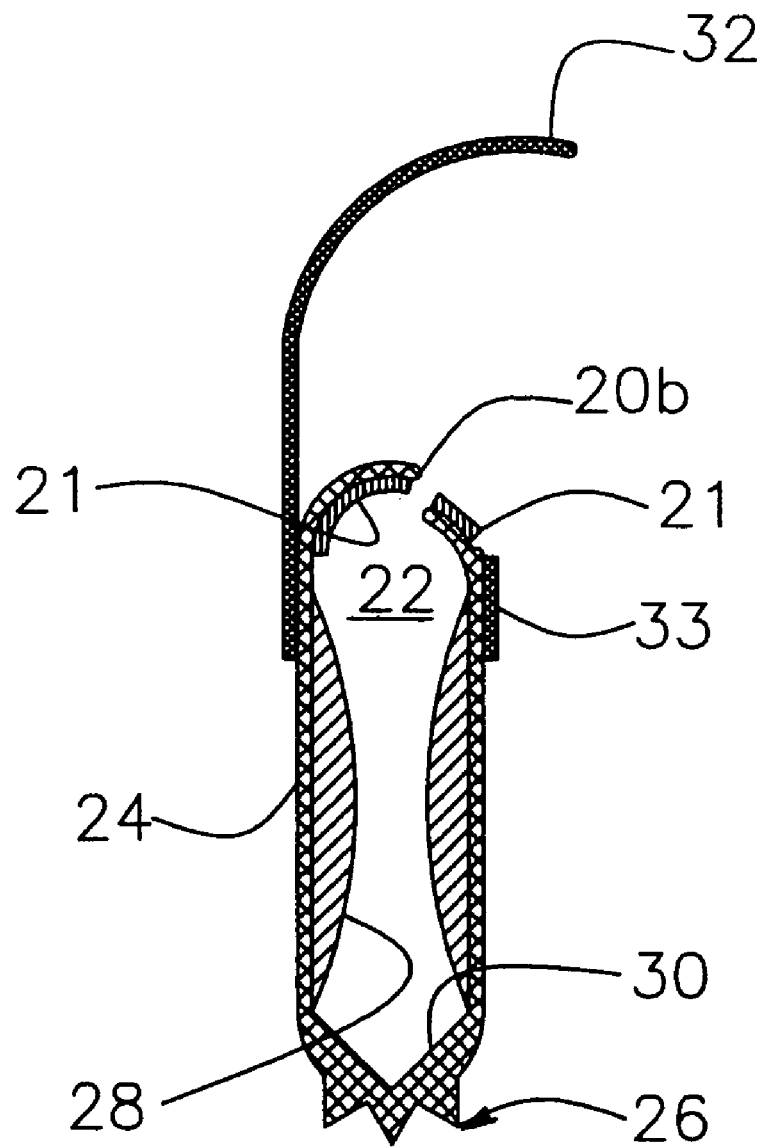
FIG. 5 is a transverse cross sectional view of the windshield wiper blade device taken along the line 5-5 in FIG. 4.

Referring further to FIGS. 4 and 5 in conjunction with FIGS. 2 and 3, the wiper jacket 20 is a flexible member preferably constructed of a rubber material that is extruded in an integral form having opposed longitudinal side walls 24 that are sealed and closed together along respective forward and rearward edges at opposite ends thereof with the bladed edge 26 disposed at the base of the side walls running longitudinally between their respective ends and closing the bottom of the wiper jacket. Extrudable plastics having a resultant flexible character are also suitable for fabrication of the wiper jacket 20. The top edge of the wiper jacket 20 is sloped to conform to the typical profile exhibited along the top of the existing wiper blade assembly 16 and is further formed having the closed portion 20a disposed along the forward slope of the top edge and the remaining portion of the top edge between the side walls 24 made open and sealable by engagement of the side flap 20b and central flap 20c over the open portion as described further below. As is better seen in FIG. 4, side flap 20b and central flap 20b each extend upwardly from side wall 24 along the open length of the top edge of the wiper jacket 20, the dotted line shown in FIG. 4 beneath each flap indicating the extended length of the open portion covered by these flaps. The side flap 20b and central flap 20c are each made to fold over and upon the open top edge of the wiper jacket 20 to close the chamber 22 of the jacket and provide containment of the wiper blade assembly 16 therein. The inside surfaces of both the side flap 20b and central flap 20c are preferably lined with fastener strips 21 made of a conventional hook-and-loop fastener material and used together with a corresponding fastener strip or segment attached to the opposite side wall 24 to secure the flaps in their closed position. Separate sealing straps 32 secured in part to the outer surface of the side flap 20b and made to extend therefrom are fabricated of a similar hook-and-loop fastener material and serve to wrap the folded flap and further seal its closed position when the outside end of the sealing strap is positioned to operatively engage an associated hook-and-loop fastener segment 33 located on the opposite side wall 24. The bladed edge 16 disposed externally along the bottom of the wiper jacket 20 is preferably formed having a multi-channel configuration, as seen most clearly in the profiles of FIGS. 3 and 5, with a triple-edge wiping element intended to clear rain, snow and associated debris from the windshield when moved in a sweeping motion upon the present wiper blade device 10. Alternative configurations of the bladed edge 16, including single and other multiple edge forms, may be suitable for incorporation along the base of the wiper jacket 20 and used in accordance with the present invention.

Within the chamber 22 of the wiper jacket 20, the interior of each side wall 24 is lined with a resilient surface layer 28 of a foam material, each resilient surface layer being applied or attached in a longitudinal strip form along the inner side wall on opposite sides of the chamber. Each resilient surface layer 28 is formed with a common inward profile, preferably rounded or curved as shown in FIGS. 3 and 5, and is similarly disposed along the opposed side wall 24 so that the respective resilient surface layers are spaced apart in the chamber 22 and made to face each other in a substantially symmetrical arrangement. In this symmetrical facing arrangement within the chamber 22, the opposed resilient surface layers 28 serve to engage and clamp the existing frame structure of the wiper blade assembly 16 transversely there between with even pressure applied from both sides that firmly holds the wiper blade assembly and secures its position within the wiper jacket 20.

An angled nesting area or nook 30 is further formed within the chamber 22 of the wiper jacket 20 centrally along the bottom interior length thereof to provide a fitted engagement area for nesting support of the wiper blade element 18 at the foot of the existing wiper blade assembly 16. The nesting support provided by the angled nesting area 30 together with the even clamping pressure provided by the opposed resilient surface layers 28 holds the entire structure of the existing blade assembly 16 firmly within the closed chamber of the wiper jacket 20 and allows the present wiper device 10 to move in a sweeping fashion concomitantly with the underlying blade assembly to clear water from the windshield surface and serve as an effective wiper blade replacement.

Referring now to FIGS. 6A-6C for operational use of the present wiper blade device 10, the wiper jacket 20 with partially open top edge and integral bladed edge 26 along the bottom is placed onto and then assembled to the existing wiper blade assembly 16 presumably upon a failure of the existing blade assembly caused by a fractured, cracked or otherwise defective blade element 18. Initially, the wiper jacket 20 is placed over the outer end of the wiper blade assembly 16 away from the wiper arm 14 with the outer tip of the blade assembly being inserted into the chamber 22 of the wiper jacket through the open portion of the top edge alongside the extended flaps 20b and 20c while the wiper jacket is inclined relative to the blade assembly with the closed portion 20c of the top edge elevated, as seen in FIG. 6A. The wiper jacket 20 is further advanced onto the wiper blade assembly 16 as the outer end of the blade assembly is more fully inserted into the chamber 22 in a position beneath the closed top edge 20c and while doing so, the open portion of the wiper jacket is rotated in the direction of the wiper arm 14 to accommodate the advanced insertion of the blade assembly, as seen in FIG. 6B. When the outer end of the wiper blade assembly 16 becomes fully inserted into the chamber 22 of the wiper jacket 20, the inner end of the blade assembly immediately beneath the wiper arm 14 is in position immediately above the end of the open top edge of the jacket so that the entire wiper blade assembly including the blade element 18 may be inserted through the open top edge and into the chamber. Thereafter, as seen in FIG. 6C, the extended flaps 20b and 20c are folded over and upon the open length of the top edge of the wiper jacket 20 and fastened accordingly to close the chamber 22 and the sealing straps 32 made to secure the folded side flap and provide firm containment of the wiper blade assembly 16 within the wiper jacket.

Therefore, it is apparent that the described invention provides an improved means for completing an effective wiper blade replacement on an automatic windshield wiper system installed upon a moving vehicle. The present invention further provides an improved device for effecting replacement of a worn or damaged windshield wiper blade that is easily implemented by hand without need for special fittings or adapters. In addition, the described invention provides a device for windshield wiper blade replacement that is universally adapted for use with the conventional automated wiper blade systems currently installed on vehicles and is easy and ready to install as an effective replacement blade particularly in emergencies when roadside technical assistance is not immediately available. Furthermore, the present windshield wiper blade device is economic and relatively inexpensive to manufacture and durable in its performance under all weather conditions.

Obviously, other embodiments and modifications of the present invention will readily come to those or ordinary skill in the art having the benefit of the teachings presented in the foregoing description and drawings. Alternate embodiments of different shapes and sizes, as well as substitution of known materials or those materials that may be developed at a future time to perform the same function as the present described embodiment are therefore considered to be part of the present invention. For example, to accommodate different lengths of existing wiper blade assemblies 16, the wiper jacket 20 may be made open at one or both ends rather than closed, as described, to allow the respective ends of the jacketed wiper blade assembly to project through the wiper jacket while still being held in firm engagement and supported within the chamber 22 by the opposed resilient surface layers 28 and the angled nesting area 30. Furthermore, the sealing straps 32 may be fastened about the wiper jacket 20 using corresponding mechanical fasteners rather than hook-and-loop fasteners as described. Accordingly, it is understood that this invention is not limited to the particular embodiment described, but rather is intended to cover modifications within the spirit and scope of the present invention as expressed in the appended claims.

What is claimed:

1. A device for replacing an existing wiper blade assembly having a wiper blade supported upon a frame structure and operatively connected to a wiper arm along a windshield of a vehicle, comprising:

a wiper jacket constructed having a bladed edge integrally formed along a bottom of said jacket and a chamber opened along a top edge thereof formed to contain the existing wiper blade assembly, the chamber being further formed having opposed side walls and an angled nesting area along a bottom of the chamber to support the existing wiper blade in fitted engagement;

a resilient surface layer disposed along each of the opposed side walls of the chamber of said wiper jacket, each of said surface layers being formed with a common inward profile having a continuous rounded configuration from top to bottom of the chamber to engage the existing wiper blade assembly transversely therebetween; and fastener means operatively connected to said wiper jacket for closing the chamber in sealed engagement about the existing wiper blade assembly.

2. A device according to claim 1, wherein said wiper jacket is further constructed having a closed portion along the top edge of said jacket and a pair of flaps extending from one side wall and adapted to fold over the open chamber.

3. A device according to claim 2, wherein said fastener means comprises:

a corresponding set of hook-and-loop fastener members respectively attached to inner surfaces of said flaps and an outer surface of the side wall opposite thereto.

4. A device according to claim 3, wherein said fastener means further comprises:

at least one strap member secured to an outer surface of said flaps and adapted to wrap about said flap when folded over the open chamber; and means for securing said strap member wrapped about said folded flap to seal the open chamber.

5. A device according to claim 4, wherein said securing means comprises:

a corresponding set of hook-and-loop fastener members respectively attached to said strap member and the outer surface of the side wall opposite thereto.

6. A device according to claim 2, wherein the bladed edge is formed having a multi-channel configuration with a plurality of wiping elements along the edge.

7. A device according to claim 1, wherein each of said resilient surface layers are separated in the chamber and disposed facing each other in a symmetrical arrangement to engage the frame structure of the existing wiper blade assembly transversely with clamping pressure evenly applied thereto.

8. A windshield wiper blade device for replacing an existing wiper blade assembly of a type having a wiper blade supported upon a frame structure and operatively connected to a wiper arm, comprising:
    a jacket member constructed having a bladed edge integrally formed along a bottom of said jacket member and a chamber partially opened along a top edge thereof formed to contain the existing wiper blade assembly, the chamber being further formed having opposed side walls each lined with a resilient surface layer having a common inward profile with a continuous rounded configuration from top to bottom of the chamber to engage the existing wiper blade assembly transversely therebetween and an angled nesting area along a bottom of the chamber to hold the existing wiper blade therein; and
    fastener means operatively connected to said jacket member for closing the chamber in sealed engagement about the existing wiper blade assembly.

9. A windshield wiper blade device according to claim 8, wherein said jacket member is further constructed having at least one flap extending from one of the opposed side walls and adapted to fold over the open top edge of the chamber.

10. A windshield wiper blade device according to claim 9, wherein said fastener means comprises:
    a corresponding set of hook-and-loop fastener members respectively attached to inner surfaces of said flaps and an outer surface of the side wall opposite thereto.

11. A windshield wiper blade device according to claim 10, wherein said fastener means further comprises:
    at least one strap member secured to an outer surface of said flaps and adapted to wrap about said flap when folded over the open chamber; and
    means for securing said strap member wrapped about said folded flap to seal the open chamber.

12. A windshield wiper blade device according to claim 11, wherein said securing means comprises:
    a corresponding set of hook-and-loop fastener members respectively attached to said strap member and the outer surface of the side wall opposite thereto.

13. A windshield wiper blade device according to claim 8, wherein the bladed edge of said jacket member is formed having a multi-channel configuration with a plurality of wiping elements along the edge.

14. In an automatic windshield wiper system having an existing wiper blade held upon associated frame structure operatively mounted to a wiper arm along a windshield of a vehicle, an improved device for wiper blade replacement comprising:
    bladed jacket means for fitted containment of the wiper blade and associated frame structure in operative engagement with the wiper arm, said bladed jacket means comprising a wiper jacket constructed having a bladed edge integrally formed along a bottom of said jacket and a chamber opened along a top edge thereof formed to contain the existing wiper blade and associated frame structure, the chamber being further formed having opposed side walls and an angled nesting area along a bottom of the chamber to support the existing wiper blade in fitted engagement, and a resilient surface layer disposed along each of the opposed side walls of the chamber from top to bottom thereof, each of said surface layers being formed with a common inward profile having a continuous rounded configuration to engage the associated frame structure transversely therebetween; and
    fastener means for releasably sealing said bladed jacket means about the wiper blade and associated frame structure.

15. The improved wiper blade replacement device of claim 14, wherein the bladed edge is formed having a multi-channel configuration with a plurality of wiping elements along the edge.

16. The improved wiper blade replacement device of claim 14, wherein each of said resilient surface layers are separated in the chamber and disposed facing each other in a symmetrical arrangement to engage the frame structure of the existing wiper blade assembly transversely with clamping pressure evenly applied thereto.

17. The improved wiper blade replacement device of claim 14, wherein said wiper jacket is further constructed having a closed portion along the top edge of said jacket and a pair of flaps extending from one side wall and adapted to fold over the open chamber.

18. The improved wiper blade replacement device of claim 17, wherein said fastener means comprises:
    a corresponding set of hook-and-loop fastener members respectively attached to inner surfaces of said flaps and an outer surface of the side wall opposite thereto.

19. The improved wiper blade replacement device of claim 18, wherein said fastener means further comprises:
    at least one strap member secured to an outer surface of said flaps and adapted to wrap about said flap when folded over the open chamber; and
    means for securing said strap member wrapped about said folded flap to seal the open chamber.

\* \* \* \* \*